United States Patent [19]

Ilic

[11] Patent Number: 5,619,702
[45] Date of Patent: Apr. 8, 1997

[54] METHOD AND APPARATUS FOR PROGRAMMING REGISTERS USING SIMPLIFIED COMMANDS

[75] Inventor: Kosta Ilic, Travis County, Tex.

[73] Assignee: National Instruments Corporation, Austin, Tex.

[21] Appl. No.: 695,968

[22] Filed: Aug. 13, 1996

Related U.S. Application Data

[63] Continuation of Ser. No. 249,171, May 25, 1994, abandoned.

[51] Int. Cl.⁶ ........................... G06F 9/45
[52] U.S. Cl. ........................... 395/705
[58] Field of Search ................. 395/600, 700

[56] References Cited

U.S. PATENT DOCUMENTS

| | | | |
|---|---|---|---|
| 4,351,024 | 9/1982 | Bradley et al. | 364/200 |
| 5,159,687 | 10/1992 | Richburg | 395/700 |

Primary Examiner—Kevin A. Kriess
Assistant Examiner—Dennis M. Butler
Attorney, Agent, or Firm—Jeffrey C. Hood; Conley, Rose & Tayon

[57] ABSTRACT

A method and apparatus for programming hardware registers using a database defining each hardware register and associated bit fields of the registers, input code including bit field write (BFW) commands identifying bit fields corresponding values to program into the bit fields and defining an array of software copies of the hardware registers, and a preprocessor for writing the appropriate code to program the hardware registers. The database provides the name, size and address of each register and the names and sizes of associated bit fields within each register. The preprocessor generates output source code by replacing the BFW commands with code to manipulate software copies of the hardware registers and to write the software copies to the hardware registers. The output source code identifies each of the affected registers and writing appropriate code to access the register only once per BFW command. The database definitions and the BFW commands allow superior organization and simplification to reduce programming time, cost and potential for error.

24 Claims, 3 Drawing Sheets

METHOD AND APPARATUS FOR PROGRAMMING REGISTERS USING SIMPLIFIED COMMANDS

This application is a continuation of application Ser. No. 08/249,171, filed May 25, 1994 now abandoned.

RESERVATION OF COPYRIGHT

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all copyright rights whatsoever.

APPENDIX

The present disclosure includes appendices A–C, which are source code listings of one embodiment of the present invention. Appendix A is a source code listing of a preprocessor which replaces bit field write commands with source code to program hardware registers. Appendix B is a source code listing of various header files used in conjunction with the source code of Appendix A. Appendix C is a listing of a database for use by the preprocessor of Appendix A defining each hardware register and its associated bit fields.

FIELD OF THE INVENTION

The present invention relates to programming hardware via software, and more particularly to programming write-only registers with simplified commands using a database and preprocessor.

DESCRIPTION OF THE RELATED ART

It is often desired to program hardware devices via software, e.g., processing systems where it is necessary to execute software commands to control hardware. Examples of such systems include an instrumentation system to perform laboratory research, process monitoring and control, data logging, analytical chemistry, test and analysis of physical phenomena and control of mechanical or electrical machinery, to name a few examples. The hardware may include transducers or other measuring and control devices to detect physical phenomena and provide electrical signals, where these electrical signals are received, measured or otherwise converted to digital data to be used by the processing system. Such instrumentation can be specialized for performing a particular task, but may also be programmable for performing a variety of tasks and functions. Programmable hardware typically includes some form of memory such as buffers or registers for storing the digital information. The memory is also used by the processing system to store values and parameters to initialize or otherwise control the hardware for performing the desired tasks. For example, a data acquisition (DAQ) or control system may include several initialization registers to program count values for counters and timers, or to otherwise select certain options or hardware devices to take desired measurements or to control some process or device.

Read/write registers are commonly used to achieve bidirectional communication between the hardware and software. However, such bidirectional communication is not always necessary. From the standpoint of the processing system, a read-only register may be sufficient to collect data from the hardware. Correspondingly, write-only registers are commonly used for setting values and counts or otherwise selecting certain options to initialize hardware to perform particular tasks. For example, a DAQ system may use write-only registers to program the hardware by establishing timing values for counters or timers, selecting positive or negative edges as triggering events, or enabling/disabling certain measuring functions, etc. Read-only or write-only registers are advantageous since the hardware required to perform the write or read operations, respectively, is eliminated. This reduction in circuitry reduces cost and simplifies instrumentation hardware used for measurement and control.

Although the use of read- or write-only registers has many advantages, they are difficult to manage in software. A plurality of registers are often required for complete control of a measurement or control system. Not all of the bits of a given register are associated with related functions, and related bits often span a plurality of registers. For example, one register may include several bits to select a counter, another register may include related bits to control the synchronization and polarity of the selected counter, while another register may include related bits to program a delay value for the selected counter. Yet these three registers typically contain other unrelated bits which must remain unchanged when programming the counter values. A programmer is faced with the task of managing the current state of all of these bits to assure proper control of the hardware.

One solution for managing hardware registers is to maintain copies of the registers in software, often referred to as shadowing. In this manner, operations are performed on the software copy, such as reading, writing, or clearing certain bits while leaving the state of the remaining bits unchanged, and then the software copy is written out to the hardware register to complete the programming procedure. For example, for a write-only register, the computer executes code to manipulate the software copy of the register with defined constants using bitwise AND and NOT logic operations, and then writes the software copy of the register out to the address location of the hardware register. Since the write-only register can not be read, this entire operation must be performed in software for each bit or series of bits within each register. Although this procedure is relatively straightforward for a given register, it is difficult for a programmer to manage a plurality of registers in this manner. This is especially true in complicated conditional structures where certain parameters must be monitored to determine which register to program and with what values. Such a task is relatively time-consuming and is very error-prone, and such errors are often very difficult to detect.

As a simple example, the following source code lines may be written in the C language to program a 16 bit wide write-only hardware register:

```
#define    COLOR_REG    17
#define    BLUE_BIT     (1<<13)
#define    RED_BIT      (1<<11)
color_reg_soft_copy = color_reg_soft_copy | BLUE_BIT;
color_reg_soft_copy = color_reg_soft_copy & (~RED_BIT);
OUTWORD (base_add+COLOR_REG, color_reg_soft_copy);
```

The first three lines are #define directives for an ANSI (American National Standard Institute) C language preprocessor, where the C preprocessor substitutes the first value in the input source code with the second value in the output source code. Thus, the string of characters COLOR_REG is substituted with the number 17, the string BLUE_BIT is substituted with (1<<13) and so on. The value (1<<13) denotes a constant where a "1" in the right-most bit location, which is typically the least significant bit, is shifted left 13 times to the fourteenth bit location. The remaining bit locations are filled with 0's, so that this operation identifies a hexadecimal number of 0×2000 if a 16-bit value is indicated. A number with prefix "0×" denotes a hexadecimal number throughout this disclosure. The value color_reg_soft_copy is a C language variable for containing a software copy of the COLOR_REG hardware register. The "|" symbol denotes the bitwise logic OR function and the "&" denotes the bitwise logic AND function. The "~" symbol denotes bitwise logic negation or the NOT function.

In the fourth line of the above code, the fourteenth or blue bit of the color_reg_soft_copy register is set to 1 by ORing it with a temporary register containing 0×2000, equivalent to binary 0010, 0000, 0000, 0000 (the commas added for clarity), where the result is stored back into the software copy. Thus, the fourteenth or blue bit is the only bit affected. In the fifth line, a 1 is shifted to the twelfth location of another temporary register and then the entire register is inverted, so that the twelfth bit becomes a 0 while the remaining bits become 1's. Thus, the temporary register contains the value 0×F7FF, equivalent to binary 1111, 0111, 1111, 1111, which is ANDed with, and stored back onto, the software copy. The only affected bit is the twelfth bit, while the remaining bits of the software copy remain unchanged. The sixth line of the above code involves writing the new software copy of the register out to the hardware. The term OUTWORD refers to a macro for directing the computer to write a value to a hardware register, where the base_add value identifies the starting address in memory where several hardware registers are located. In this manner, the decimal number 17 is added to the base_add address to locate the COLOR_REG hardware register in memory, and the value in the color_reg_soft_reg is written to the COLOR_REG register. In summary, the selected bits of the software copy are modified and then the software copy is written to program the write-only register.

As another example using C language pointers, the following lines may be used in source code to program several related bits in a register:

```
#define     REG 33
uInt32*     value_ptr;
value_ptr = & (mp—>Copy_COMM3_REG);
(*value_ptr) &= 0xFFBF;
(*value_ptr) |= 0x1B00;
mp—>Copy_COMM3_REG = &(value_ptr);
OUTWORD(base_add + REG, (*value_ptr));
```

The above code clears bits 5 and 6 and sets bits 11, 12, and 13 of a hardware register at address 33. Here value_ptr is a pointer variable loaded with an address to point to a software copy referred to as Copy_COMM3_REG within a structure pointed to by a pointer mp. The register pointed to by value_ptr is ANDed with hexadecimal value 0xFFBF to clear bits 5 and 6, and ORed with hexadecimal value 0x1B00 to set bits 11-13, while leaving the remaining bits unchanged. The software copy is updated with the new value and the result is written to the hardware register denoted by REG.

The lines of code to define the various registers, constants and variables of the database are typically placed in a header at the beginning of the source code or in a separate file for better organization. The programmer is required to write code similar to that described above for each hardware register to be programmed. Since the particular registers and individual bits of each register to be programmed often depends upon other variables, the programmer is required to properly embed the desired code within conditional structures, such as if-then-else structures, loop structures, case structures, etc. It is clear that programming a plurality of hardware registers a monumental task, which is time-consuming and error prone, especially in complicated conditional structures.

It is desirable therefore to provide a method and apparatus for more easily programming and managing low-level write-only registers, while maintaining the desired speed and performance.

SUMMARY OF THE INVENTION

A method of programming hardware registers according to the present invention includes storing a database defining each register as well as the various bit fields within each of the defined registers, receiving code including simplified BFW commands identifying bit fields and values to be programmed into those bit fields, and executing a preprocessor on the input code to expand the BFW commands to the appropriate output code. In this manner, the present invention allows a programmer to use simplified bit field write (BFW) commands to program the registers. The resulting output code is then compiled and executed on a computer.

In the preferred embodiment, the register database defines the size, address, name, and software mechanism to access each of the hardware registers. Each defined register is then followed by the names, sizes, and attributes of each of the bit fields within the register. The size of the bit fields may vary from one bit up to the size of the register, and may even span multiple registers. The database defining the hardware registers and associated bit fields may be at the header of the source code of the preprocessor, or placed into a separate file and linked together with the object code of the preprocessor. The use of a database to define each of the bit fields of the registers allows superior organization of the registers by placing the bit field information into a manageable format. In this manner, a programmer need not manage the individual bits since this function is performed by the preprocessor.

In the preferred embodiment, a preprocessor according to the present invention detects the BFW commands in the input code, retrieves each bit field and the value to be written to that bit field, determines all of the affected hardware registers, and replaces the BFW commands with appropriate code to manipulate each hardware register only once. Performance is maximized since the computations are performed before the software is compiled rather than at runtime. Preferably, an array of software copies of the hardware registers are also defined, so that the preprocessor writes the code to update the relevant software copies and then to write the software copies to program the corresponding hardware registers. If the BFW commands are written to program multiple fields of several registers, the preprocessor generates and organizes code to perform only one access for each hardware register to achieve optimal results. Thus, the efficiency of the compiled program is maximized since each hardware register is accessed only once per BFW command. The input code developed by the programmer is also greatly simplified since each BFW command only includes a list of the bit fields and corresponding values to be written to the bit fields.

Therefore, a programming method according to the present invention substantially simplifies the input code, maximizes performance of the resulting software program and allows superior organization, thereby reducing programming time, cost and potential for error.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
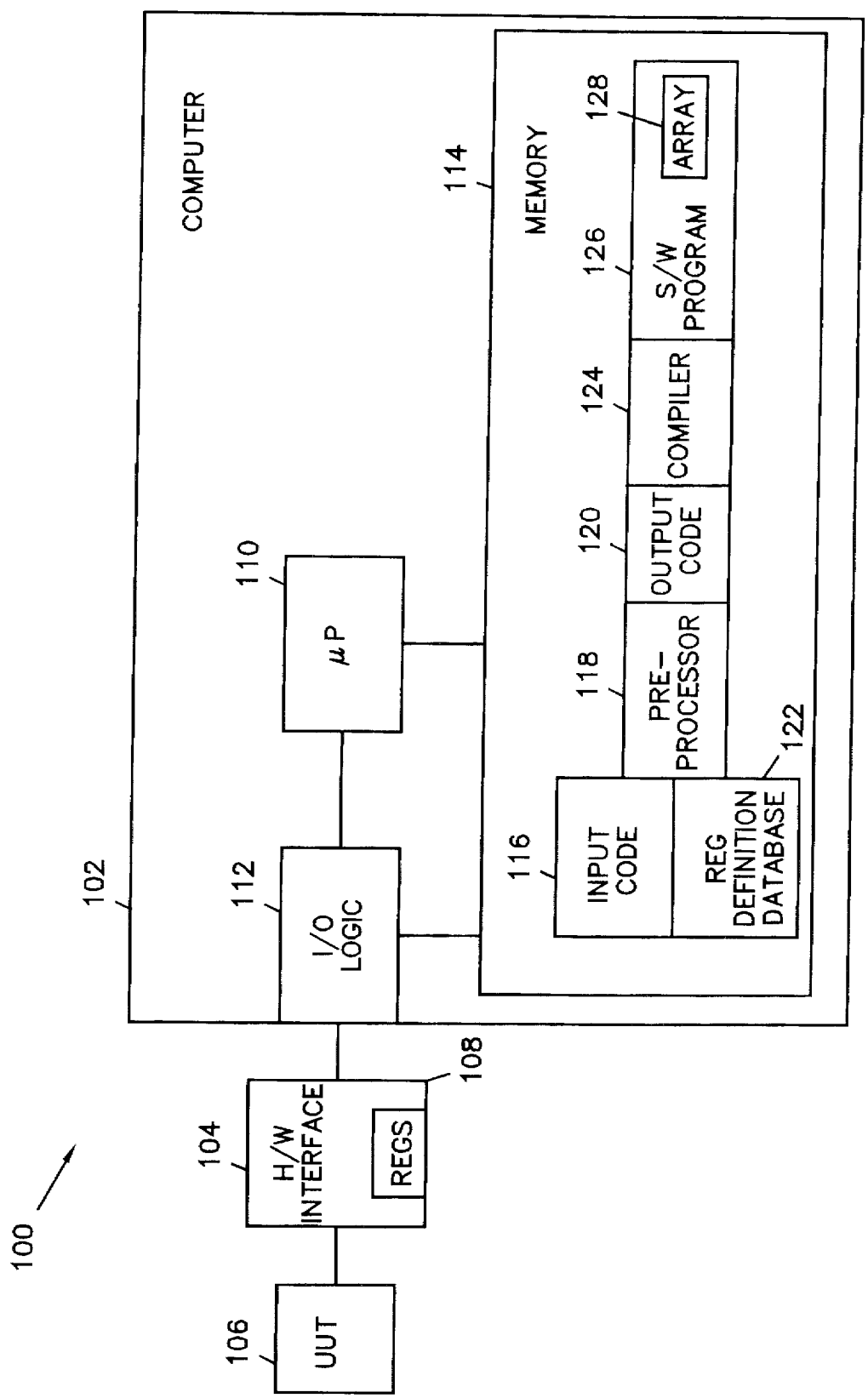
FIG. 1 is a simplified block diagram of an instrumentation system according to the present invention using a computer for programming and controlling hardware.

Referring now to FIG. 1, a simplified block diagram is shown of an instrument system 100 using a computer 102 for programming, controlling and receiving data from a hardware interface 104 connected to a unit under test (UUT) 106. The UUT 106 generally represents any process, physical phenomena, mechanical or electrical machinery, etc. being monitored, measured or controlled as desired. The hardware interface 104 may be a separate unit, but is preferably an interface card which plugs into the input/output (I/O) bus of the computer 102. The hardware interface 104 typically includes any transducers or devices for measuring parameters or controlling equipment, and also includes signal conditioning and computer interface apparatus, such as a GPIB (general purpose interface bus), data acquisition board (DAQ), VXIbus, RS-232, etc., for communicating digital information with the computer system 102. The hardware interface 104 includes programmable hardware, such as write-only registers 108, which are accessible by the computer 102 for establishing the appropriate measurement or control of the UUT 106. It is understood that similar concepts could be applied to read-only registers.

The computer 102 includes a microprocessor 110, I/O logic 112 for interfacing with the hardware interface 104, and memory 114 for storing data and for storing and executing software. For purposes of this disclosure, the memory 114 generally includes permanent storage media, such as magnetic disk and disk drives and the like, as well as dynamic memory such as random access memory (RAM) for loading and executing software programs. The input code 116 and the register definition database 122 are preferably written in a high level language, such as the C language, although it is understood that the present invention is not limited to any particular computer language since other languages, such as C++, PASCAL, FORTRAN, BASIC, assembly language, etc., could be used. The input code 116 is any program written to perform whatever functions are desired for the instrumentation system 100, which includes programming the hardware registers 108. For programming the hardware registers 108, the input code 116 includes bit field write (BFW) commands, described more fully below. The register definition database 122 defines each of the write-only hardware registers 108 accessible by the computer 102 and each of the bits or bit fields within each hardware register.

A preprocessor 118 according to the present invention is stored in the memory 114, which when executed, receives the input code 116 as input and generates output code 120, which is then stored in memory 114. The preprocessor 118 replaces the BFW (bit field write) commands with appropriate code commands into the output code 120. The preprocessor 118 also inserts the appropriate code and commands to cause the software program 126 to generate an array of software copies 128, in a similar manner as arrays are typically created in software. A compiler 124 is executed, which receives the output code 120 and generates and stores a software program 126 in the memory 114. The software program 126 is then loaded into RAM and executed by the microprocessor 110 to program the hardware interface 104 and hardware registers 108 as desired to perform the necessary measurement or control functions. While executing, the software program 126 creates the array of software copies 128 of the hardware registers 108 for shadowing purposes.

The array of software copies 128 is a structure for storing copies of the hardware registers 108 while the software program 126 is executing. It is preferably defined within the input code 116, but could be defined elsewhere, such as in a separate file or even within the preprocessor 118. The preprocessor 118 generates code to use the array of software copies 128 to program and to save the values written out to program the hardware registers 108. As will be described more fully below, each software copy is updated and then written out to program a corresponding one of the hardware registers 108. The term array is used generically since any suitable data structure could be used for shadowing purposes.

The database 122 is preferably located in a separate file and either referenced in the preprocessor 118, or compiled together with the source code of the preprocessor 118, or compiled separately and linked together using some type of object code linker to create a single executable program as the preprocessor 118. Of course, many other variations are possible, where the database could be a separate file used by the preprocessor as input while generating the output code 120. In any event, the database 122 includes the name of each of the hardware registers 108, its size, location or address in memory, followed by the name, location and size of each bit field within the respective registers, although other attributes may also be defined for the registers and the bit fields. For example, the register definitions in the database 122 may include a parameter defining whether to maintain a software copy of the register in the array of software copies 128 and another parameter defining a software mechanism, such as a macro, used to access the register. The bit field definition preferably includes other attributes, such as an optional parameter indicating whether a hardware bit field is automatically cleared after being asserted, in which case the software copy must also be cleared after being written to that hardware register 108. The preprocessor 118 uses the various parameters to assure that the software copy mirrors the hardware copy, if desired.

Although the database 122 is preferably written in C language eventually, it may be generated in another interim format and converted to C using a conversion program. For example, a register is defined using the following format:

R <name> <size> address> <copy> <access> where <name> is the register name, <size> is size of the register preferably in bits, <address> is the register address in any desired format (e.g. hexadecimal, decimal, octal, etc.), <copy> indicates whether or not to maintain a software copy in the array of software copies 128, and <access> is the name of the software mechanism used to access the register, such as the name of a macro. The address could be an address in the memory 114, but is preferably in the I/O space accessed through the I/O logic 112 to write to the hardware registers 108. The copy parameter is preferably one of two values, either "SAVE" to keep a software copy or "TRASH" indicating a software copy is unnecessary. It is understood that the particular order of the parameters is arbitrary and that other parameters could be added if desired. The most important parameters are the name, address, and size of the register for appropriate manipulation, where the copy parameter is desired but could be omitted.

The register line is followed by one or more bit field lines defining each of the bit fields within the register. Although many possible formats for the bit fields are contemplated, the preferred format is as follows:

F<name> <width> [<strobe>]

where <name> is the bit field name, <width> is the bit field width in bits, and <strobe> is an optional parameter for indicating a bit field that is written without modifying the corresponding software copy of the hardware register. Each of the bit fields of the register is one or more bits in width. The name for each bit field allows specific identification of each bit field in each hardware register 108. As a particular example, three of the hardware registers 108 and corresponding bit fields are defined as follows:

the remaining bit fields are 1 bit each. The AI Mode 1 Register has eight bit fields, including two 5-bit bit fields named AI SI Source Select and AI CONVERT Source Select located at the 10 most significant bits. In this manner, the bit fields defined above can easily be referenced in the source code, as will be described below.

The above register and bit field definitions are then converted to C language using a simple conversion program. The above format and conversion are for convenience and simplicity, although the database 122 could also be written directly in C language. Appendix C provides a full listing in C language of the register definition database 122 used in the preferred embodiment. For purposes of illustration, the AI Mode 3 Register is provided below in C language format:

{AI_Mode_3_Register,16,0,0,0×57,0×FF,"AI Mode 3 Register","AI Mode 3 Register"}, {AI_External_Gate_Select,5,0,0,0×57,0×FF,"AI External Gate Select", "AI Mode 3 Register"}, {AI_External_Gate_Polarity,1,5,0,0×57,0×FF,"AI External Gate Polarity", "AI Mode 3 Register"}, {AI_FIFO_Mode,2,6, 0,0×57, 0×FF,"AI FIFO Mode","AI Mode 3 Register"}, {AI_External_Gate_Mode,1,8,0,0>57,0×FF,"AI External Gate Mode", "AI Mode 3 Register"},

| R | AI Mode 3 Register | 16 | 0×57 | SAVE | STC_WRITE_16_W |
|---|---|---|---|---|---|
| F | AI External Gate Select | 5 | | | |
| F | AI External Gate Polarity | 1 | | | |
| F | AI FIFO Mode | 2 | | | |
| F | AI External Gate Mode | 1 | | | |
| F | AI Delayed START1 | 1 | | | |
| F | AI Delayed START2 | 1 | | | |
| F | AI SI2 Source Select | 1 | | | |
| F | AI SI Special Trigger Delay | 1 | | | |
| F | AI Software Gate | 1 | | | |
| F | Reserved | 2 | | | |
| R | AI START STOP Select Register | 16 | 0×3E | SAVE | STC_WRITE_16_W |
| F | AI START Select | 5 | | | |
| F | AI START Edge | 1 | | | |
| F | AI START Sync | 1 | | | |
| F | AI STOP Select | 5 | | | |
| F | AI STOP Edge | 1 | | | |
| F | AI STOP Sync | 1 | | | |
| F | AI STOP Polarity | 1 | | | |
| F | AI START Polarity | 1 | | | |
| R | AI Mode 1 Register | 16 | 0×0C | SAVE | STC_WRITE_16_W |
| F | AI Trigger Once | 1 | | | |
| F | AI Continuous | 1 | | | |
| F | Reserved One | 1 | | | |
| F | AI Start Stop | 1 | | | |
| F | AI SI Source Polarity | 1 | | | |
| F | AI CONVERT Source Polarity | 1 | | | |
| F | AI SI Source Select | 5 | | | |
| F | AI CONVERT Source Select | 5 | | | | where the registers AI Mode 3 Register, AI START STOP Select Register and AI Mode 1 Register are each 16 bits in length, located in the memory 114 or I/O space of the computer 102 at hexadecimal address 0×57, 0×3E and 0×06, respectively, and are written using a predefined macro called STC_WRITE_16_W. The AI Mode 3 Register includes ten separate bit field definitions, including a 5-bit AI External Gate Select bit field located at the least significant 5 bits, a 2-bit AI FIFO Mode bit field and where the most significant 2 bits are reserved. The remaining bit fields are 1 bit in length. Likewise, the AI START STOP Select Register includes eight bit fields, where the bit fields AI START Select and AI STOP Select are 5 bits in width each and {AI_Delayed_START1,1,9,0,0×57,0×FF,"AI Delayed START1","AI Mode 3 Register"}, {AI_Delayed_START2,1,10,0,0×57,0×FF,"AI Delayed START2", "AI Mode 3 Register"}, {AI_SI2_Source_Select,1,11,0,0×57,0×FF,"AI SI2 Source Select", "AI Mode 3 Register"}, {AI_SI_Special_Trigger_Delay,1, 12, 0, 0×57, OFF, "AI SI Special Trigger Delay", "AI Mode 3 Register"}, {AI_Software_Gate,1,13, 0, 0×57, 0×FF, "AI Software Gate", "AI Mode 3 Register"}, {Reserved, 2, 14, 0, 0×57, 0×FF, "Reserved", "AI Mode 3 Register"}, where the first parameter between each bracket pair { } is the name of the register or bit field, the second parameter is the register or bit field size in bits, the third parameter is the bit location of the bit field within the register, the fourth parameter is the copy parameter for a register line (0=SAVE, 1=TRASH) or the fourth parameter is the strobe parameter for a bit field line (0=no strobe, 1=strobe), the fifth parameter is the address of the register, the sixth parameter is not used, and the seventh and eighth parameters are string definitions of the name of the bit field followed by the name of the register for debug purposes. The macro definitions are suppressed in this example since the preprocessor 118 typically includes one or more header files for defining constants and macros. Examples of such header files are provided in appendix B.

It is clear that the database 122 may be easily established to define as many of the hardware registers 108 as desired, including the names and sizes of the bit fields contained within each of registers. It is understood that the particular formats described above are exemplary only and that other formats could be defined depending upon the programming language used. Alternatively, since the hardware registers 108 and corresponding bit field definitions are typically predefined according to the hardware requirements, the lines of the database 122 may be generated automatically by a computer.

The input code 116 includes the BFW commands to program the bit fields with the desired patterns or values. Each BFW command preferably has the following form:

BFW(list of bit field name/value pairs, LAST )

where the list of bit field name/value pairs includes one or more pairs of bit field names followed by a value to be programmed into that bit field, and where " LAST " denotes the end of the list. For example, the input code 116 could include the following commands:

```
BFW( AI  SI  Special  Trigger  Delay,    0,
     AI  START  Select,                  0,
     AI  START  Edge,                    1,
     AI  START  Sync,                    1
     AI  START  Polarity,                0,                           LAST );
BFW( AI  SI  Source  Select,             p-->ai  si  source  select,
     AI  SI  Source  Polarity,           0,                           LAST );
``` where the name of each bit field is followed by the number of value to be programmed into the respective bit field. Note that the AI SI Special Trigger Delay bit field is the 13th bit of the AI Mode 3 Register and that the AI START Select, Edge, Sync and Polarity bit fields are located in the AI START STOP Select Register. Note further that although the AI START Select bit field is 5 bits wide, the input code 116 need only specify a 0 to clear all five bits. Thus, a plurality of bit fields from a plurality of registers may be programmed with a single BFW command if the particular order of programming the registers or bit fields is not important. Alternatively, if the particular programming order for the bit fields is important, the first BFW command listed above can be replaced by the following BFW commands:

BFW(AI  SI  Special  Trigger  Delay, 0,  LAST );
BFW(AI  START  Select, 0,  LAST );
BFW(AI  START  Edge, 1,  LAST );
BFW(AI  START  Sync, 1,  LAST );
BFW(AI  START  Polarity, 0,  LAST );

to assure that the bit fields are programmed in the particular order listed.

The preprocessor 118 is then executed upon the input code 116, which generates the output code 120. The preprocessor 118 merely copies each of the commands other than BFW commands to the output code 120. However, for each BFW command, the preprocessor 118 forms the bit field identifiers and corresponding values for each BFW command definition, then creates a list of all of the hardware registers 108 that are affected by the BFW command, generates the code that performs the appropriate manipulation of the corresponding software copy within the array of software copies 128 and replaces the BFW command with the generated code in the output code 120. For example, the BFW commands described above are received by the preprocessor 118 and the following code is preferably written to the output code 120:

```
uInt32* soft  copy  ptr;
soft  copy  ptr =&(stc-->stc  write  soft  copy[87]);
(* soft  copy  ptr)    &=    0xEFFF;
(* soft  copy  ptr)    |=    0x0060;
stc-->stc  write  soft  copy[87] =&(soft  copy  ptr);
STC  WRITE  16  W(87, (* soft  copy  ptr));
uInt32* soft  copy  ptr;
soft  copy  ptr =&(stc-->stc  write  soft  coppy[62]);
(* soft  copy  ptr)    &    0x7F80;
(* soft  copy  ptr)    |=    0x0060;
stc-->stc  write  soft  copy[62] =&(soft  copy  ptr);
STC  WRITE  16  W(62, (* soft  copy  ptr));
uInt32* soft  copy  ptr;
soft  copy  ptr =&(stc-->stc  write  soft  copy [12];
(*soft  copy  ptr) &= 0xF82F;
(*soft  copy  ptr) | (((p -->ai  si  source  select)& 0x1F)<<6)
                  | (((0) & 0x1) <<4);
stc -->stc  write  soft  copy [12] =&(soft  copy  ptr);
STC  WRITE  16  W(12, (*soft  copy  ptr));
``` where soft copy ptr is a 32-bit pointer variable and the pointer stc points to a software structure containing copies of the hardware registers 108 to implement the array of software copies 128. The → operator is a pointer reference of a structure as known to those skilled in the art of programming in C language. Also, the decimal numbers 87, 62, and 12 correspond to the hexadecimal address values 0×57, 0×3E and 0×0C of the defined hardware registers 108.

In the first group of code lines, the soft copy ptr value is defined and then made to point to the software copy in the array of software copies 128 of the hardware register 108 to be programmed. In the next line, the software copy is ANDed with the hex value 0×EFFF, which corresponds to binary 1110, 1111, 1111, 1111. Thus, the software copy of the register is ANDed with all 1's in the bit fields, except for a 0 located in the fourth most significant bit location corresponding to the AI SI Special Trigger Delay bit field of the AI Mode 3 Register. In the next line, the result is ORed with all zeros, which is equivalent to a non operation so that this code line is extraneous and not necessary. In this example, the preprocessor 118 is relatively simple and generates code to perform an AND operation followed by an OR operation, even if one of these operations is unnecessary. The performance penalty is relatively minimal since computation is performed during compilation rather than at runtime. However, several optimization methods could be implemented. For example, the preprocessor 118 could be more sophisticated to recognize extraneous lines and not generate corresponding code to the output. In that case, the OR operation would not be generated. Alternatively, a compiler 124 executed on the output code 120 after preprocessing could be instructed to ignore extraneous lines and operations.

In the next line of the code, the copy pointed to by soft_copy_ptr is stored back into the software copy in the stc structure within the database 123. In the last line of the first group, the STC_WRITE command writes out to decimal address 87, which corresponds to hexadecimal address 0×57 to program the AI_Mode_3_Register.

The second group of commands is used to program the AI_START_STOP_Select_Register corresponding to the next four lines of the first BFW command listed above. In the first two lines, the soft_copy_ptr is defined and then made to point to the software copy of the write-only register located at decimal address 62, corresponding to hexadecimal address 0×3E of the AI_START_STOP_Select_Register. In the third line, the contents pointed to by soft_copy_ptr is then ANDed with hexadecimal value 0×7F80, which is equal to binary 0111, 1111, 1000, 0000, which programs a 0 in the least significant seven bits and into the most significant bit, thereby clearing the 5-bit field AI_START_Select and the AI_START_edge, and AI_START_sync and AI_START_Polarity bit fields of the AI_START_STOP_Select_Register. In the fourth line, the software copy is ORed with hex value 0×0060, which equals bit value 0000, 0000, 0110, 0000, which forces a 1 into each of the 5th and 6th bit locations, corresponding to the AI_START_Edge and AI_START_sync bit fields of the AI_START_STOP_Select_Register. This corresponds precisely to that specified in the first BFW command. In this manner, all bit locations to be programmed are first cleared including those that are set in the following command line. Clearing all of the bits is not necessary, but allows the preprocessor 118 to be simpler without incurring any performance penalty. In the last two lines, the contents of the temporary software register pointed to by soft_copy_ptr is written back into the corresponding software copy of the stc structure, and then written out to hardware address decimal 62 to program the corresponding hardware register.

The final group of input code 116 programs the 5-bit AI_SI_Source_Select bit field and the 1-bit AI_SI_Source_Polarity bit field of the AI_Mode_1_Register according to the second BFW command. Again, soft_copy_ptr is defined and set to point to the appropriate software copy in the stc structure or array of software copies 128. In the third line, all bit locations of the software copy are first cleared by ANDing with hexadecimal value 0×F82F. In the fourth line, a 5-bit constant value p→ai_si_source_select is ANDed with 5 ones (0×1F) to clear the non-relevant bit locations, and then shifted left six times to convert to 16 bits and to place a 1 in each relevant bit location, while placing a 0 in the remaining bit locations. In the same line, the result is ORed with another value defined as 0 ANDed with a 1 and shifted left four times to program a 0 into the AI_SI_Source_Polarity bit field. This OR operation is extraneous since a 0 has already been programmed into that location. Again, the preprocessor or compiler could be optimized to remove or otherwise ignore this extraneous portion of the operation. In the last two lines, the software copy in the stc structure is updated and the calculated value is written to program the AI_Mode_1_Register hardware register.

Figure 2:
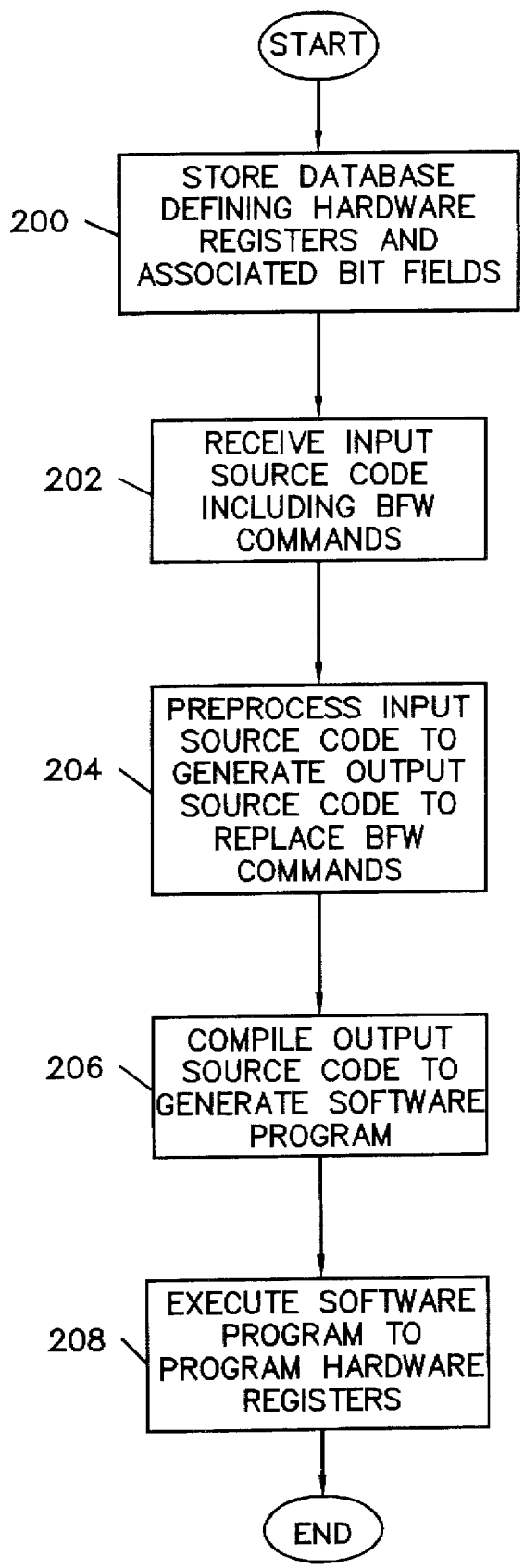
FIG. 2 is a flowchart diagram illustrating a procedure for programming hardware registers according to the present invention.

Referring now to FIG. 2, a flowchart diagram is shown summarizing the procedure detailed above. Each of the hardware registers 108 and associated bit fields are defined in the database 122 as indicated by a step 200. The input code 116 including the BFW commands is received by the computer 102 in a step 202. The array of software copies 128 is preferably defined in step 204 within the input code 116, although the actual array is not created until runtime of the software program 126. The input code 116 is then preprocessed by the preprocessor 118 in a step 204 to generate the output code 120. The preprocessor 118 preferably generates code to use the array of software copies 128 to update and store the values to be written to the hardware registers 108. The output code 120 is compiled by the compiler 124 in a step 206 to create the software program 126. The software program 126 is then executed in a step 208 by the microprocessor 110 of the computer 102, which uses the I/O logic 112 to program the hardware registers 108.

Figure 3:
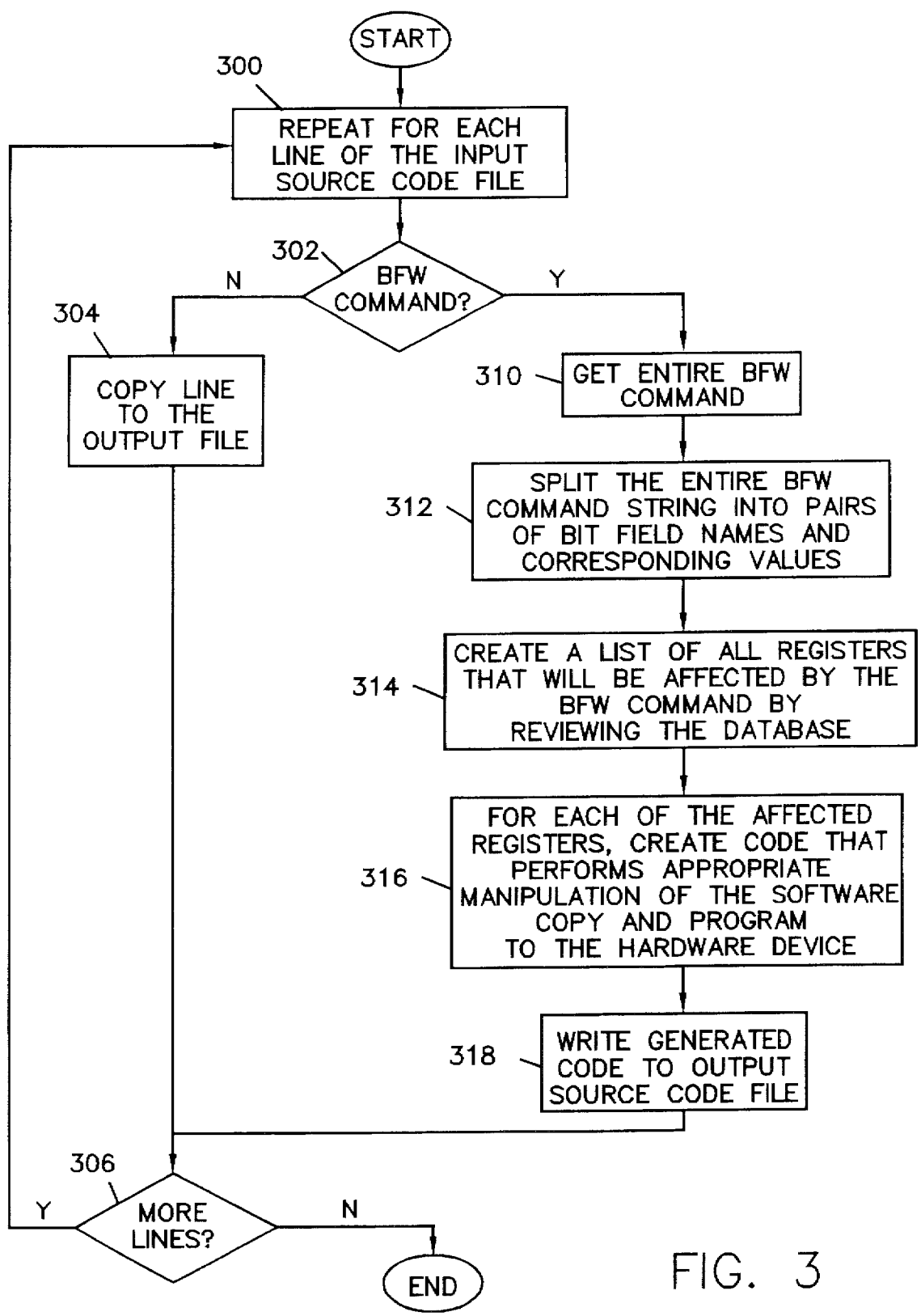
FIG. 3 is a flowchart diagram illustrating operation of a preprocessor according to the present invention.

Referring now to FIG. 3, a flowchart diagram is shown illustrating operation of the preprocessor 118 according to the present invention. Operation begins at step 300, where the preprocessor 118 reads the first or the next line of an input code 116. Each command line contains a string of characters followed by some end character, such as a semicolon(;), denoting the end of the command line. Operation then proceeds to a step 302 which determines if the line contains a BFW command, which is preferably detected if the letters "BFW" are present in the line. If not, operation proceeds to a step 304, where the entire line is copied to the output file. Operation then proceeds to a step 306 which queries whether there are more lines in the input code 116. If not, operation is completed. If there are more lines in the input code 116 as determined in step 306, operation returns to step 300 to read the next line of the input code 116. The end of file (eof) character is preferably detected to determine whether there are more command lines in the input code 116.

Referring back to step 302, if the line contains a BFW command, operation proceeds to a step 310, where the entire BFW command is retrieved from the input code 116. The end of the BFW command is preferably indicated by a parameter_LAST_. Operation then proceeds to a step 312, where the BFW command string is divided into pairs of bit field names and corresponding values to be programmed into that bit field. Once all of these pairs are defined in step 312, operation proceeds to a step 314 where all of the hardware registers 108 associated with the bit fields in step 312 are determined and listed. Operation then proceeds to a step 316, where the preprocessor 118 generates the necessary code to perform the appropriate logic operations to manipulate all of the bit fields of each software copy within the array of software copies 128 of each hardware register 108, and to write the software copy to the corresponding hardware register 108. Details of an embodiment of particular code are provided in the source code listing provided in appendix A. As stated previously, the particular code used depends upon the programming language and the level of code optimization desired. Finally, operation proceeds to a step 318, where the generated code is written to the output code 120. From step 318, operation proceeds to step 306 to determine if more lines exist in the input code 116. In this manner, only one hardware access is required for each hardware register 108 affected for each BFW command, thereby optimizing execution of the software program 126. Such optimization allows the software program 126 to be executed much more quickly, since only one access is necessary rather than multiple accesses as would be done in prior art.

For purposes of full disclosure and completeness, a portion of an example input code 116 and the corresponding output code 120 is provided below. The output code 120 is generated by a preprocessor 118 for preprocessing according to the method of the present invention. The if-then-else structure emphasizes the simplicity of the input code compared to that source code which a programmer would be required to write without the present invention.

EXAMPLE INPUT CODE

```
STC_START_AI_SINGLE_RUN(ai_scan_start)
{
    BFW( AI_Configuration_Start,    1, LAST );
    if(p->ai_will_use_internal_scan_clock)
    {
        BFW( AI_SI_Special_Trigger_Delay, 0,
             AI_START_Select,         0,
             AI_START_Edge,           1,
             AI_START_Sync,           1,
             AI_START_Polarity,       0,     LAST );
        if(p->ai_si_will_use_internal_time)
        {
            BFW( AI_SI_Source_Select,    p->ai_si_source_select,
                 AI_SI_Source_Polarity,  0,                          LAST );
        }
        else
        {
            BFW( AI_SI_Source_Select,    p->ai_si_source_select,
                 AI_SI_Source_Polarity,  p-<ai_si_source_polarity,   LAST );
        }
        if ( ! (p—>ai_will_be_retriggerable))
        {
            /* you can specify special delay from START1 */
            /* trigger to the first start of scan by    */
            /* preloading SI                            */
            BFW( AI_SI_Load_A,           p->ai_si_special_ticks-1, LAST );
            BFW( AI_SI_Initial_Load_Source, 0,                     LAST );
            BFW( AI_SI_Load,             1,                        LAST );
            BFW( AI_SI_Load_A,           p->ai_si_ordinary_ticks-1, LAST);
            BFW( AI_SI_Reload_Mode,      0,                        LAST );
        }
        else if( ! (p->ai_with_change_rate_on_the_fly))
        {
            /* you can specify special delay from START1 */
            /* trigger to the first start of scan by    */
            /* using one of the reload modes.           */
            BFW( AI_SI_Load_B,           p—>ai_si_special_ticks-1, LAST );
            BFW( AI_SI_Load_A,           p—>ai_si_ordinary_ticks-1, LAST );
            BFW( AI_SI_Initial_Load_Source, 1,                     LAST );
            BFW( AI_SI_Load,             1,                        LAST );
            BFW( AI_SI_Initial_Load_Source, 0,
                 AI_SI_Reload_Mode,      6,                        LAST );
        }
        else
        {
            /* interval from the START1 trigger to the  */
            /* first start of scan is equal to the scan */
            /* interval                                 */
            BFW( AI_SI_Load_A,           p—>ai_si_ordinary_ticks-1, LAST );
            BFW( AI_SI_Initial_Load_Source, 0,
                 AI_SI_Reload_Mode,      0,                        LAST );
            BFW ( AI_SI_Load,            1,                        LAST );
        }
        BFW( AI_SI_Write_Switch,     0,                            LAST );
    }
    else
    {
        /* In the single-wire for START and CONVERT case, you need to
        /* set AI_START_Sync to 0.
        /* The single-wire case is defined by START and CONVERT coming
        /* from a single external source, with the same polarity.
        /* In other cases, it is safe to set AI_START_Sync to 1.
        /* It is always safe to set AI_START_Edge to 1. */
        if( (p—>ai_start_select == p—>ai_convert_source_select)
            && (p->ai_start_polarity !=p->ai_convert_source_polarity))
        /* The inequality of the two polarities indicates that the two */
        /* signals are of the same polarity, since those data         */
        /* structure components correspond to the hardware...         */
        {
            DaqDebugPrint(("AI_START_Sync = 0\n"));
            BFW( AI_START_Select,    p—>ai_start_select,
```

```
                AI_START_Sync,       0,
                AI_START_Edge,       1,
                AI_START_Polarity,   p—>ai_start_polarity,    LAST );
          }
          else
          {
            DaqDebugPrint(("AI_START_Sync = 1\n"));
            BFW (AI_START_Select,    p—>ai_start_select,
                AI_START_Sync,       1,
                AI_START_Edge,       1,
                AI_START_Polarity,   p—>ai_start_polarity,    LAST );
          }
          if(p—>ai_will_have_special_delay)
          {
            BFW( AI_SI_Special_Trigger_Delay, 1,
                AI_SI_Write_Switch, 0,   LAST );
            if(p—>ai_si_will_use_internal_time)
            {
              BFW(AI_SI_Source_Select, p—>ai_si_source_select,
                AI_SI_Source_Polarity, 0,              LAST );
            }
            else
            {
              BFW( AI_SI_Source_Select, p—>ai_si_source_select,
                AI_SI_Source_Polarity, p—>ai_si_source_polarity, —LAST );
            }
            BFW( AI_SI_Load_A,       p—>ai_si_special_ticks-1, —LAST );
            BFW( AI_SI_Initial_Load_Source, 0,             LAST );
            BFW( AI_SI_Load,         1,             LAST );
          }
          else
          {
            BFW( AI_SI_Special_Trigger_Delay, 0,  LAST );
          }
      }
      if(p—>ai_will_be_staged == YES)
      {
          BFW( AI_SI_Load_B,       p—>ai_si_new_ordinary_ticks[0]-1,
                                                    —LAST );
          BFW( AI_SI_Reload_Mode,  0,           LAST );
          BFW ( AI_SI_Switch_Load_On_SC_TC,20 1,    LAST );
          p—>ai_si_last_load_register = 1;
      }
      else
      {
          p—>ai_si_last_load_register = 0;
      }
      BFW( AI_Configuration_Start,  0,
          AI_Configuration_End,  1,  LAST );
}
STC_END
```

RESULTING OUTPUT CODE (AFTER PREPROCESSING)

```
STC_START_AI_SINGLE_RUN(ai_scan_start)
{
  {
   {
    uInt32* soft_copy_ptr;
    soft_copy_ptr = &(stc—>stc_write_soft_copy[72]);
    (* soft_copy_ptr) |= 0x0010;
    STC_WRITE_16_W(72, (* soft_copy_ptr));
    (* soft_copy_ptr) *= ~0xF7CF;
   }
  }
  if(p—>ai_will_use_internal_scan_clock)
  {
    /* AI_START_Select         := 0      */
    /* AI_START_Edge           := 1      */
    /* AI_START_Sync           := 1      */
    /* AI_START_Polarity       := 0      */
    {
     {
      uInt32* soft_copy_ptr;
      soft_copy_ptr = *(stc—>stc_write_soft_copy[87]);
```

```
        (* soft_copy_ptr) &= 0xEFFF;
        STC_WRITE_16_W(87, (* soft_copy_ptr));
        }
        {
        uInt32* soft_copy_ptr;
        soft_copy_ptr = &(stc->stc_write_soft_copy[62]);
        (* soft_copy_ptr) &= 0x7F80;
        (* soft_copy_ptr) |= 0x0060;
        STC_WRITE_16_W(62, (* soft_copy_ptr));
        }
    }
    if(p->ai_si_will_use_internal_time)
    {
        /* AI SI Source Polarity       := 0                   */
        {
            {
            uInt32* soft_copy_ptr;
            soft_copy_ptr = &(stc->stc_write_soft_copy[12]);
            (* soft_copy_ptr) *= 0xF82F;
            (* soft_copy_ptr) |= ( ((p->ai_si_source_select)& 0x1F) <<6)
                                   |( ((0) & 0x1) <<4);
            STC_WRITE_16_W(12, (* soft_copy_ptr));
            }
        }
    }
    else
    {
        /* AI SI Source Polarity       := p->ai_si_source_polarity    */
        {
            {
            uInt32* soft_copy_ptr;
            soft_copy_ptr = &(stc->stc_write_soft_copy[12]);
            (* soft_copy_ptr) *= 0xF82F;
            (* soft_copy_ptr) |= ( ((p->ai_si_source_select) & 0x1F) <<6)
                                   |( ((p->ai_si_source_polarity) & 0x1) <<4);
            STC_WRITE_16_W(12, (* soft_copy_ptr));
            }
        }
    }
}
if( ! (p->ai_will_be_retriggerable))
{
    /* you can specify special delay from START1 */
    /* trigger to the first start of scan by    */
    /* preloading SI                */
    {
        {
        STC_WRITE_32_W(14, ( ((p->ai_si_special_ticks-1) & 0xFFFFFF) <<0
));
        }
    }
    {
        {
        uInt32* soft_copy_ptr;
        soft_copy_ptr = &(stc->stc_write_soft_copy[13]);
        (* soft_copy_ptr) &= 0xFF7F;
        STC_WRITE_16_W(13, (* soft_copy_ptr));
        }
    }
    {
        {
        STC_WRITE_16_W(8, 0x0200);
        }
    }
    {
        {
        STC_WRITE_32_W(14, ( ((p->ai_si_ordinary_ticks-1) & 0xFFFFFF) <<
0));
        }
    }
    {
        {
        uInt32* soft_copy_ptr;
        soft_copy_ptr = &(stc->stc_write_soft_copy[13]);
        (* soft_copy_ptr) &= 0xFF8F;
        STC_WRITE_16_W(13, (*soft_copy_ptr) );
        }
    }
}
else if ( ! (p->ai_with_change_rate_on_the_fly))
{
```

-continued

```
        /* you can specify special delay from START1 */
        /* trigger to the first start of scan by    */
        /* using one of the reload modes.           */
        {
          {
            STC_WRITE_32_W(16, ( ((p-->ai_si_special_ticks-1) & 0xFFFFFF) <<0
));
          }
        }
        {
          {
            STC_WRITE_32_W(14, ( ((p-->ai_si_ordinary_ticks-1) & 0xFFFFFF) <<
0));
          }
        }
        {
          {
            uInt32* soft_copy_ptr;
            soft_copy_ptr = &(stc-->stc_write_soft_copy[13]);
            (* soft_copy_ptr) |= 0x0080;
            STC_WRITE_16_W(13, (* soft_copy_ptr));
          }
        }
        {
          {
            STC_WRITE_16_W(8, 0x0200);
          }
        }
        /* AI_SI_Reload_Mode              := 6          */
        {
          {
            uInt32* soft_copy_ptr;
            soft_copy_ptr = &(stc-->stc_write_soft_copy[13]);
            (* soft_copy_ptr) &= 0xFF0F;
            (* soft_copy_ptr) |= 0x0060;
            STC_WRITE_16_W(13, (* soft_copy_ptr));
          }
        }
      }
      else
      {
        /* interval from the START1 trigger to the   */
        /* first start of scan is equal to the scan */
        /* interval                                 */
        {
          {
            STC_WRITE_32_W(14, ( ((p-->ai_si_ordinary_ticks-1) & 0xFFFFFF) <<
0));
          }
        }
        /* AI_SI_Reload_Mode              := 0          */
        {
          {
            uInt32* soft_copy_ptr;
            soft_copy_ptr = &(stc-->stc_write_soft_copy[13]);
            (* soft_copy_ptr) = 0xFF0F;
            STC_WRITE_16_W(13, (* soft_copy_ptr));
          }
        }
        {
          {
            STC_WRITE_16_W(8, 0x0200);
          }
        }
      }
      {
        {
          uInt32* soft_copy_ptr;
          soft_copy_ptr = &(stc-->stc_write_soft_copy[13]);
          (* soft_copy_ptr) *= 0xFFF7;
          STC_WRITE_16_W(13, (* soft_copy_ptr));
        }
      }
    }
  else
  {
    /* In the single-wire for START and CONVERT case, you need to
    /* set AI_START_Sync to 0.
    /* The single-wire case is defined by START and CONVERT coming
    /* from a single external source, with the same polarity.
```

```
/* In other cases, it is safe to set AI_START_Sync to 1. */
/* It is always safe to set AI_START_Edge to 1. */
if( (p—>ai_start_select == p—>ai_convert_source_select)
    && (p—>ai_start_polarity != p—>ai_convert_source_polarity))
/* The inequality of the two polarities inicates that the two */
/* signals are of the same polarity, since those data       */
/* structure components correspond to the hardware...       */
{
    DaqDebugPrint(("AI_START_Sync = 0\n"));
    /* AI_START_Sync          := 0                  */
    /* AI_START_Edge          := 1                  */
    /* AI_START_Polarity      := p—>ai_start_polarity    */
    {
        {
            uInt32* soft_copy_ptr;
            soft_copy_ptr = &(stc—>stc_write_soft_copy[62]);
            (* soft_copy_ptr) &= 0x7F80;
            (* soft_copy_ptr) |= ( ((p—>ai_start_select) & 0x1F) <<0)
                                 |( ((0) & 0x1) <<6)
                                 |( ((1) & 0x1) <<5)
                                 |( ((p—>ai_start_polarity) & 0x1) <<15);
            STC_WRITE_16_W(62, (* soft_copy_ptr));
        }
    }
}
else
{
    DaqDebugPrint(("AI_START_Sync = 1\n"));
    /* AI_START_Sync          := 1                  */
    /* AI_START_Edge          := 1                  */
    /* AI_START_Polarity      := p—>ai_start_polarity    */
    {
        {
            uInt32* soft_copy_ptr;
            soft_copy_ptr = &(stc—>stc_write_soft_copy[62]);
            (* soft_copy_ptr) &= 0x7F80;
            (* soft_copy_ptr) |= ( ((p—>ai_start_select) & 0x1F) <<0)
                                 |( ((1) & 0x1) <<6)
                                 |( ((1) & 0x1) <<5)
                                 |( ((p—>ai_start_polarity) & 0x1) <<15);
            STC_WRITE_16_W(62, (* soft_copy_ptr));
        }
    }
}
if(p—>ai_will_have_special_delay)
{
    /* AI_SI_Write_Switch       := 0                 */
    {
        {
            uInt32* soft_copy_ptr;
            soft_copy_ptr = &(stc—>stc_write_soft_copy[87]);
            (* soft_copy_ptr) |= 0x1000;
            STC_WRITE_16_W(87, (* soft_copy_ptr));
        }
        {
            uInt32* soft_copy_ptr;
            soft_copy_ptr = &(stc—>stc_write_soft_copy[13]);
            (* soft_copy_ptr) *= 0xFFF7;
            STC_WRITE_16_W(13, (* soft_copy_ptr));
        }
    }
    if(p—>ai_si_will_use_internal_time)
    {
        /* AI_SI_Source_Polarity     := 0             */
        {
            {
                uInt32* soft_copy_ptr;
                soft_copy_ptr = &(stc—>stc_write_soft_copy[12]);
                (* soft_copy_ptr) *= 0xF82F;
                (* soft_copy_ptr) |= ( ((p—>ai_si_source_select) & 0x1F) <<6)
                                     |( ((0) & 0x1) <<4);
                STC_WRITE_16_W(12, (* soft_copy_ptr));
            }
        }
    }
    else
    {
        /* AI_SI_Source_Polarity     := p—>ai_si_source_polarity    */
        {
            {
```

```
                    uInt32* soft_copy_ptr;
                    soft_copy_ptr = &(stc—>stc_write_soft_copy[12]);
                    (* soft_copy_ptr) &= 0xF82F;
                    (* soft_copy_ptr) |= ( ((p—>ai_si_source_select) & 0x1F) <<6)
                                        |( ((p—>ai_si_source_polarity) & 0x1) <<4);
                    STC_WRITE_16_W(12, (* soft_copy_ptr));
                }
            }
        }
        {
            {
                STC_WRITE_32_W(14, ( ((p—>ai_si_special_ticks-1) & 0xFFFFFF) <<0
));
            }
        }
        {
            {
                uInt32* soft_copy_ptr;
                soft_copy_ptr = &(stc—>stc_write_soft_copy[13]);
                (* soft_copy_ptr) &= 0xFF7F;
                STC_WRITE_16_W(13, (* soft_copy_ptr));
            }
        }
        {
            {
                STC_WRITE_16_W(8, 0x0200);
            }
        }
    }
    else
    {
        {
            {
                uInt32* soft_copy_ptr;
                soft_copy_ptr = &(stc—>stc_write_soft_copy[87]);
                (* soft_copy_ptr) &= 0xEFFF;
                STC_WRITE_16_W(87, (* soft_copy_ptr));
            }
        }
    }
}
if(p—>ai_will_be_staged == YES)
{
    {
        {
            STC_WRITE_32_W(16, ( ((p—>ai_si_new_ordinary_ticks[0]-1) & 0xFFFFFF)
<<0));
        }
    }
    {
        {
            uInt32* soft_copy_ptr;
            soft_copy_ptr = &(stc—>stc_write_soft_copy[13]);
            (* soft_copy_ptr) &= 0xFF8F;
            STC_WRITE_16_W(13, (* soft_copy_ptr));
        }
    }
    {
        {
            uInt32* soft_copy_ptr;
            soft_copy_ptr = &(stc—>stc_write_soft_copy[4]);
            (* soft_copy_ptr) |= 0x0200;
            STC_WRITE_16_D(4, (* soft_copy_ptr));
            (* soft_copy_ptr) &= ~0xC3FF;
        }
    }
    p—>ai_si_last_load_register = 1;
}
else
{
    p—>ai_si_last_load_register = 0;
}
/* A1 Configuration End                  := 1         */
{
    {
        uInt32* soft_copy_ptr;
        soft_copy_ptr = &(stc—>stc_write_soft_copy[72]);
        (* soft_copy_ptr) &= 0xFEEF;
        (* soft_copy_ptr) |= 0x0100;
        STC_WRITE_16_W(72, (* soft_copy_ptr));
```

```
    (* soft_copy_ptr) *= ~0xF7CF;
    }
  }
}
STC_END
```

It can now be appreciated that the method and apparatus for programming low level hardware write-only registers provides several advantages. First, once all of the registers and bit fields are defined in a database, the input code need only include simple BFW commands to manipulate the bit fields of the hardware registers by name. The database is easily established and the BFW commands are much easier to write, resulting in improved organization and simpler source code. The use of BFW commands allows much improved organization of the bit field information, since the code refers to and manipulates individual bit fields, rather than the specific code for manipulating the entire register each time an access is necessary. A preprocessor according to the present invention provides optimization of the final source code by combining all of the bit fields within each BFW command corresponding to a register, so that only one access of the hardware register is necessary for each BFW command issued. This allows the compiled program to execute faster. Although a programmer could conceivably optimize the code manually, such manual coding is much more difficult and error prone, would consume valuable programming time and is usually not done. A preprocessor according to the present invention automates the whole process and simplifies programming of write-only registers.

Another programming method is to use functions to program each register. A function can simplify the source code since the code for bit manipulation is written only once, and each line of the source code to implement a function call is rather simple. The function must be generalized and sophisticated enough to program multiple bits of multiple registers, which causes a slight performance penalty if the call performs a simple operation. Although functions provided better organization for programming registers, there is a significant amount of overhead associated with functions resulting in slower operation. First, a function call forces the processor to jump to a remote location to perform the computations, and then return with the calculated parameters, thereby consuming valuable time. More significantly, a function frees all computation to be performed at run time since the same function is used to program many registers, so that the particular bits and corresponding values are not defined until runtime. If runtime performance is vital, which it often is, functions can not be used due to significant performance penalty.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method of generating code to program hardware registers, comprising the steps of:

storing a database defining the hardware registers and associated bit fields of each hardware register, wherein the database includes names identifying bit fields of each of said hardware registers;

receiving input code including one or more bit field write commands, wherein said one or more bit field write commands comprise simplified commands for programming the hardware registers, wherein each of said bit field write commands includes one or more of said names identifying bit fields in one or more of said hardware registers and one or more corresponding values to program into each of said bit fields identified by said one or more names; and preprocessing the input code to generate output code in which the one or more bit field write commands are replaced with code to program the one or more values into the respective hardware registers.

2. The method of claim 1, further comprising the steps of:

defining an array of software copies of the hardware registers; and wherein said step of preprocessing comprises the steps of:

generating output code in which the one or more bit field write commands are replaced with code to program the values into corresponding bits of the software copies of the hardware registers according to the bit field write commands; and generating code which writes each software copy to a corresponding hardware register.

3. The method of claim 2, wherein the array of software copies comprises a software structure for containing the software copies and an address to the structure, wherein an address of each software copy relative to the address of the structure corresponds to the address of a corresponding hardware register.

4. The method of claim 1, wherein said step of storing a database defining the hardware registers and associated bit fields comprises the steps of:

storing a name, size and address for each hardware register; and storing a name and size for each bit field within each hardware register.

5. The method of claim 1, wherein for each bit field write command, said step of receiving input code comprises the steps of:

receiving one or more bit fields; and receiving a corresponding value to program into each specified bit field.

6. The method of claim 1, wherein said preprocessing step comprises the steps of:

reading a line of the input code;

copying the line of the input code to the output code if the line does not contain a bit field write command;

if the line contains a bit field write command, identifying the hardware register corresponding to each bit field;

generating code to write the values corresponding to the bit fields into corresponding bits of each of the identified hardware registers; and copying the generated code into the output code; and repeating said reading, copying, identifying, generating and copying steps for the entire input code.

7. The method of claim 6, wherein the code generated during said step of generating code to write the values accesses each of the identified hardware registers only once for each bit field write command.

8. The method of claim 6, wherein the input code defines an array of software copies of the hardware registers, and wherein for each identified hardware register, said step of generating code comprises the steps of:

generating code to write the values corresponding to the bit fields into corresponding bits of each of the software copies of the identified hardware registers; and generating code to write each software copy to a corresponding hardware register.

9. The method of claim 1, wherein said preprocessing step is performed by a preprocessor program and the database is in a file, further comprising the steps of:

compiling the preprocessor program and the database; and linking the compiled preprocessor program and database together to form a single executable preprocessor program.

10. A method of programming hardware registers, comprising the steps of:

storing a database defining the hardware registers and associated bit fields of each hardware register, wherein the database includes names identifying bit fields of each of said hardware registers;

receiving input code including bit field write commands, wherein said bit field write commands comprise simplified commands for programming the hardware registers, wherein each of said bit field write command includes one or more of said names identifying one or more bit fields and one or more corresponding values to program into each of said bit fields;

preprocessing the input code to generate output code in which the bit field write commands are replaced with code to program the one or more values into the respective hardware registers;

compiling the software program; and executing the compiled software program on a computer.

11. The method of claim 10, wherein said step of storing a database defining the hardware registers and associated bit fields comprises the steps of:

storing a name, size and address for each hardware register; and storing a name and size for each bit field within each hardware register.

12. The method of claim 10, further comprising the steps of:

defining an array of software copies of the hardware registers; and wherein said step of preprocessing includes the steps of:

generating output code in which the one or more bit field write commands are replaced with code to program the values into corresponding bits of the software copies of the hardware registers according to the bit field write commands; and generating code which writes each software copy to a corresponding hardware register.

13. The method of claim 12, wherein the array of software copies comprises a structure for containing the software copies and an address to the structure, wherein an address of each software copy relative to the address of the structure corresponds to the address of a corresponding hardware register.

14. The method of claim 10, wherein for each bit field write command, said step of receiving input code further comprises the steps of:

receiving one or more bit fields; and receiving a corresponding value to program into each specified bit field.

15. The method of claim 10, wherein said preprocessing step further comprises the steps of:

reading a line of the input code;

copying the line of the input code to the output code if the line does not contain a bit field write command;

if the line contains a bit field write command, identifying the hardware register corresponding to each bit field;

generating code to write the values corresponding to the bit fields into corresponding bits of each of the identified hardware registers; and copying the generated code into the output code; and repeating said reading, copying, identifying, generating and copying steps for the entire input code.

16. The method of claim 15, wherein the code generated during said step of generating code to write the values accesses each of the identified hardware registers only once for each bit field write command.

17. The method of claim 15, wherein for each identified hardware register, said step of generating code to write the values comprises the steps of:

defining an array of software copies of the hardware registers;

generating code to write the values corresponding to the bit fields into corresponding bits of each of the software copies of the identified hardware registers; and generating code to write the software copy to a corresponding hardware register.

18. A computer for programming hardware registers, comprising:

memory for storing a database defining the hardware registers and associated bit fields of each hardware register, wherein the database includes names identifying bit fields of each of said hardware registers, and an array of software copies of each of the hardware registers;

means for receiving input code including bit field write commands wherein said bit field write commands comprise simplified commands for programming the hardware registers, wherein each of said bit field write commands includes one or more of said names identifying bit fields in one or more of said hardware registers and one or more corresponding values to program into each of said one or more bit fields identified by said one or more names;

a preprocessor for automatically converting said input code into output code, wherein said output code includes code to program said one or more values into corresponding bits of said software copies of the hardware registers according to said bit field write commands, and wherein said output code also includes code for writing each one of said software copies to a corresponding hardware register;

a compiler for compiling said output code; and a microprocessor for executing said compiled output code to program the hardware registers.

19. The computer of claim 18, wherein said database includes a name, size and address for each hardware register, and a name and size for each bit field associated with the hardware register.

20. The computer of claim 18, wherein each one of said bit field write commands specifies one or more bit fields and a corresponding value to program into each specified bit field.

21. The computer of claim 18, wherein said preprocessor includes:

means for reading each line of said input code;

means for determining if a line in said input code contains a bit field write command;

means coupled to said determining means for copying said line to said input code if said line does not contain a bit field write command;

means for identifying bit fields and corresponding values to program into said bit fields within each BFW command line;

means for generating code to write said values corresponding to said bit fields into corresponding bits of each of the identified hardware registers; and means for copying said generated code into the output code.

22. The computer of claim 21, wherein said code generated by said generating means accesses each of the identified hardware registers only once for each bit field write command.

23. The computer of claim 21 wherein said generating means generates code to write said values corresponding to said bit fields into corresponding bits of each of said software copies of the identified hardware registers, and code to write each one of said software copies to a corresponding hardware register.

24. The computer of claim 18, wherein said hardware registers are write-only registers.

* * * * *

UNITED STATES PATENT AND TRADEMARK OFFICE
CERTIFICATE OF CORRECTION

PATENT NO. : 5,619,702

DATED : April 8, 1997

INVENTOR(S) : Kosta Ilic.

It is certified that error appears in the above-identified patent and that said Letters Patent is hereby corrected as shown below:

In the Claims:

Claim 12, col. 27, line 48, please delete "off" and substitute "of:".

Signed and Sealed this

Third Day of November, 1998

BRUCE LEHMAN

Attest:

Attesting Officer

Commissioner of Patents and Trademarks